United States Patent
Hasegawa et al.

(10) Patent No.: US 6,737,116 B2
(45) Date of Patent: May 18, 2004

(54) METHOD FOR FABRICATING PLATED PRODUCTS

(75) Inventors: Yukitaka Hasegawa, Aichi-ken (JP); Yousuke Maruoka, Aichi-ken (JP); Yasuhiko Ogisu, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/090,636

(22) Filed: Mar. 6, 2002

(65) Prior Publication Data

US 2002/0160206 A1 Oct. 31, 2002

(30) Foreign Application Priority Data

Mar. 6, 2001 (JP) ......................................... 2001-062242

(51) Int. Cl.⁷ ............................. B05D 3/10; B05D 1/36
(52) U.S. Cl. .................... 427/343; 427/404; 427/407.1; 427/409; 427/327; 427/309
(58) Field of Search ................................. 427/402, 404, 427/407.1, 409, 327, 318, 309, 343, 352, 430.1

(56) References Cited

U.S. PATENT DOCUMENTS

| 3,958,994 A | * | 5/1976 | Burnett ...................... 430/160 |
| 5,061,395 A | * | 10/1991 | Meng ......................... 510/423 |
| 5,547,741 A | * | 8/1996 | Wilson ....................... 428/215 |
| 5,578,347 A | * | 11/1996 | Chan .......................... 427/336 |
| 5,607,984 A | * | 3/1997 | Duocastella-Codina et al. . 521/172 |
| 6,399,152 B1 | * | 6/2002 | Goodrich ..................... 427/250 |
| 2001/0012563 A1 | * | 8/2001 | Sakai ........................ 428/412 |

FOREIGN PATENT DOCUMENTS

JP          10-309774          11/1998

* cited by examiner

*Primary Examiner*—Michael Barr
(74) *Attorney, Agent, or Firm*—Posz & Bethards, PLC

(57) ABSTRACT

A method for fabricating a plated product including a basecoat layer, a metal plating layer, and a topcoat layer that are formed on a surface of a base is provided. The method includes the step of forming the basecoat layer and the metal plating layer successively on the surface of the base. The step is followed by removing impurities from the surface of the metal plating layer. The topcoat layer is then formed on the surface of the metal plating layer.

4 Claims, 2 Drawing Sheets

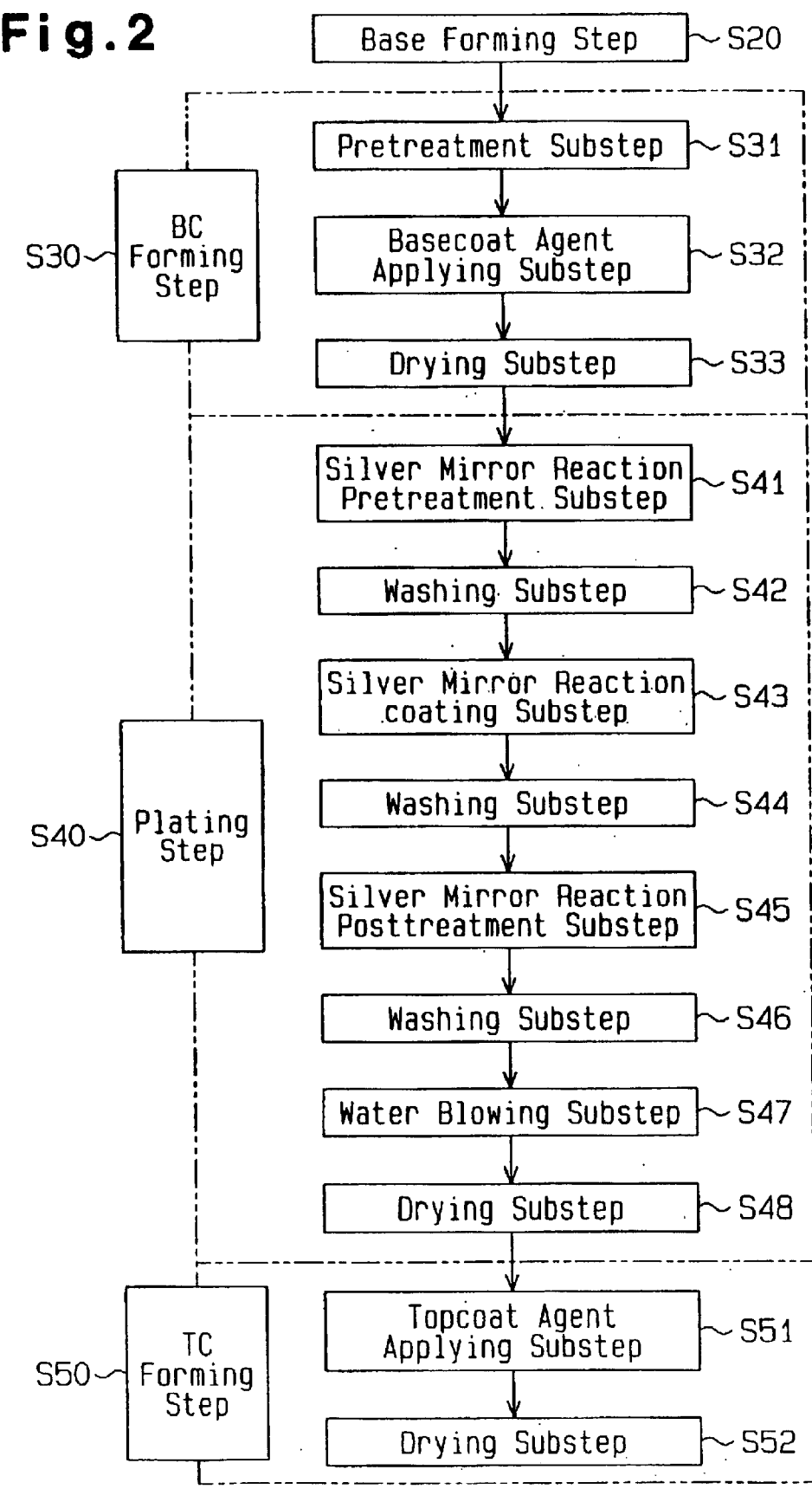

US 6,737,116 B2

METHOD FOR FABRICATING PLATED PRODUCTS

BACKGROUND OF THE INVENTION

The present invention relates to methods for fabricating a plated product with a base on which a basecoat layer, a metal plating layer, and a topcoat layer are formed, and, more particularly, to methods for fabricating a plated product that prevents the surface of a metal plating layer from being discolored by impurities.

For example, Japanese Laid-Open Patent Publication No. 10-309774 describes a method for fabricating a layered body with a silver plating layer. The layered body includes a base, an undercoat layer, the silver plating layer, and a topcoat layer. The undercoat layer is formed by drying an undercoat agent, or a varnish that contains alkoxy-titanium-ester and at least either a silane coupling agent with epoxy radicals or epoxy resin.

To form the layered body, the undercoat agent is applied to the surface of the base and is dried to obtain the undercoat layer. Subsequently, an aqueous solution of silver is applied to the surface of the undercoat layer and is dried to form the silver plating layer. The topcoat layer is then formed on the surface of the silver plating layer. The method of the aforementioned patent publication is applicable to layered products with various bases such as insulating or conductive bases. Further, as fabricated by this method, the layered body has the silver plating layer and the undercoat layer that are securely bonded together, and the durability of the layered body is improved. That is, the method makes it possible to efficiently and easily fabricate a layered body that has a silver plating layer with an improved property.

However, if the silver plating layer of the layered body contains even a small quantity of impurities, the impurities are naturally oxidized to discolor the surface of the silver plating layer to a yellowish tone, thus hampering the appearance of the layered body.

SUMMARY OF THE INVENTION

Accordingly, to solve the aforementioned problem, it is an objective of the present invention to provide a method for fabricating a plated product that easily prevents the surface of a metal plating layer from being discolored by impurities.

To achieve the foregoing and other objectives and in accordance with the purpose of the present invention, the invention provides a method for fabricating a plated product with a basecoat layer, a metal plating layer, and a topcoat layer that are formed on a surface of a base. The method includes the steps of forming the basecoat layer and the metal plating layer successively on the surface of the base, removing impurities from a surface of the metal plating layer after the formation of the basecoat layer and the metal plating layer, and forming the topcoat layer on the surface of the metal plating layer after the removal of the impurities.

A further perspective of the present invention is a method for fabricating a plated product with a basecoat layer, a metal plating layer, and a topcoat layer that are formed on a surface of a base. The method includes the steps of forming the basecoat layer and the metal plating layer on the surface of the base, forming an antioxidant film on a surface of the metal plating layer after the formation of the basecoat layer and the metal plating layer, and forming the topcoat layer on the surface of the metal plating layer after the formation of the antioxidant film.

A further perspective of the present invention is a method for fabricating a plated product with a basecoat layer, a metal plating layer, and a topcoat layer that are formed on a surface of a base. The method includes the steps of forming the basecoat layer and the metal plating layer on the surface of the base, disintegrating impurities by applying an acid to a surface of the metal plating layer or immersing the surface of the metal plating layer in the acid after the formation of the basecoat layer and the metal plating layer, adsorbing the impurities by applying a protein dispersed solution to the surface of the metal plating layer or immersing the surface of the metal plating layer in the solution after the disintegration of the impurities, and forming the topcoat layer on the surface of the metal plating layer after the adsorption of the impurities.

A further perspective of the present invention is a method for fabricating a plated product with a basecoat layer, a metal plating layer, and a topcoat layer that are formed on a surface of a base. The method includes the step of forming the basecoat layer on the surface of the base. The basecoat layer is obtained by applying a basecoat agent to the surface of the base or immersing the surface of the base in the basecoat agent and drying the basecoat agent on the surface of the base. The method also includes the step of forming the metal plating layer on the basecoat layer. The metal plating layer is obtained by a chemical silver plating method. The method further includes the step of removing impurities from the surface of the metal plating layer after the formation of the basecoat layer and the metal plating layer and the step of forming the topcoat layer on the surface of the metal plating layer after the removal of the impurities.

A further perspective of the present invention is a plated product with a basecoat layer, a metal plating layer, and a topcoat layer that are formed on a surface of a base. The metal plating layer is formed of silver. The value $\Delta b^*$ obtained by subtracting the colorimetric value $b^*$ of a standard wet type plated product of Chromium(VI) from the value $b^*$ of the plated product, as measured in accordance with Lab color system, is lower than or equal to five.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objectives and advantages thereof, may best be understood by reference to the following description of the presently preferred embodiments together with the accompanying drawings in which:

FIG. 2 is a flowchart showing a method for fabricating the plated product of FIG. 1.

DETAILED DESCRIPTION OF THE PREFERRED EMBODIMENTS

Figure 1:
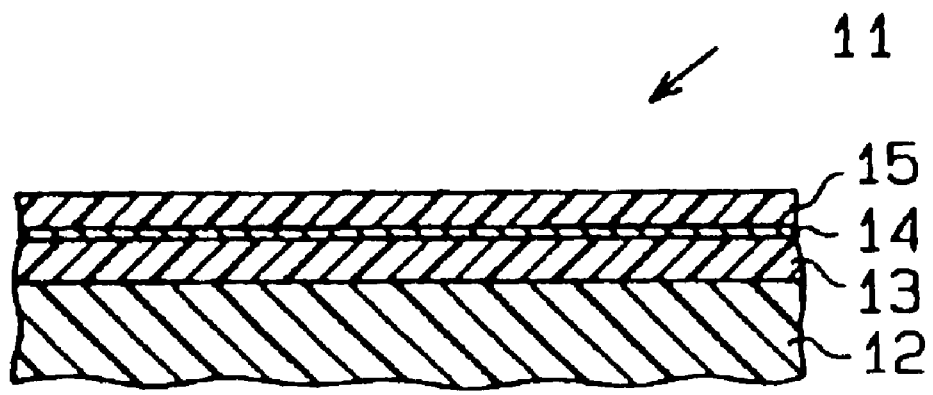
FIG. 1 is a cross-sectional view showing a portion of a plated product of an embodiment according to the present invention.

An embodiment of the present invention will now be described with reference to the drawings.

As shown in FIG. 1, a plated product 11 includes a base 12 formed of synthetic resin. A basecoat (BC) layer 13, a silver plating layer 14, and a topcoat (TC) layer 15 are applied in this order to a surface (a design surface) of the base 12. The silver plating layer 14 is formed by a chemical plating method (electroless deposition) that uses a silver mirror reaction.

The base 12 is formed of acrylonitrile-butadiene-styrene copolymer (ABS), polycarbonate-ABS (PC-ABS) alloy, polypropylene (PP), olefin type thermoplastic elastomer (TPO), polymethyl methacrylate (PMMA), or thermoplastic elastomer (TPE) by a known injection molding method.

To form the basecoat layer 13, a basecoat agent is applied to the surface of the base 12 or the surface of the base 12 is immersed in the basecoat agent. The basecoat agent is then dried to complete the basecoat layer 13. The basecoat agent includes polyester resin, alkyd resin, and acrylic resin. However, since a double-liquid hardened type polyurethane resin is easy to apply, it is preferred that the resin be used as the basecoat agent.

To form the silver plating layer 14, a solution of ammoniacal silver nitrate ($[Ag(NH_3)_2]^+OH^-$) (Tollens reagent) and a reducer solution are applied to a surface of the basecoat layer 13 such that the two solutions are mixed on the surface. This causes an oxidization-reduction reaction, and silver (Ag) is deposited on the surface of the basecoat layer 13 to form the silver plating layer 14. It is preferred that an organic compound with an aldehyde group including glyoxal (R—CHO), sodium sulfite, or sodium thiosulfate be used as the reducer solution. The silver mirror reaction between the ammoniacal silver nitrate solution and the organic compound with the aldehyde group is indicated by the following formula (1):

$$2[Ag(NH_3)_2]^+OH^- + R\text{—}CHO \rightarrow 2Ag + R\text{—}CO_2NH_4 + H_2O + 3NH_3 \quad (1)$$

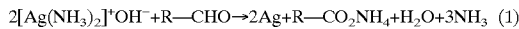

To form the topcoat layer 15, a topcoat agent is applied to a surface of the silver plating layer 14 or the surface of the silver plating layer 14 is immersed in the topcoat agent. The topcoat agent is then dried to complete the topcoat layer 15. The topcoat agent includes polyester resin and acrylic resin. However, since the double-liquid hardened type polyurethane resin or acrylic modified silicone resin is easy to apply, it is preferred that these resins be used as the topcoat agent.

A method for fabricating the plated product 11 will now be described.

First, as shown in FIG. 2, the base 12 is formed in a predetermined shape through injection molding in step S20. A basecoat forming step (a BC forming step) S30 is then conducted.

In the step S30, the basecoat layer 13 is formed on the surface of the complete base 12 using the basecoat agent. More specifically, in a pretreatment substep S31, the surface (the design surface) of the base 12 is sufficiently washed with a cleaning agent such as isopropanol. Subsequently, in a basecoat agent applying substep S32, the design surface of the base 12 is uniformly coated with the basecoat agent. The coating may be conducted by applying the basecoat agent on the design surface of the base 12 or immersing the design surface of the base 12 in the basecoat agent. However, since the design surface of the base 12 is easily coated by spraying the basecoat agent on the design surface, it is preferred that the coating be conducted through spraying. Afterwards, in a drying substep S33, the basecoat agent on the design surface of the base 12 is dried at approximately 80 degrees Celsius for about 60 minutes. The process then moves on to a plating step S40.

In the step S40, the silver plating layer 14 is formed on the basecoat layer 13. First, in a silver mirror reaction pretreatment substep S41, a 2 to 3 weight percent solution of stannic chloride ($SnCl_2$) is applied to the surface of the basecoat layer 13 or the surface of the basecoat layer 13 is immersed in the solution. Tin is thus adsorbed to the surface of the basecoat layer 13. Subsequently, in a washing substep S42, the surface of the basecoat layer 13 is washed with ion exchange water (ion exchange water having 3 $\mu S/cm$ or lower of electric conductivity is preferred) or distilled water. Excessive stannic chloride, which remains non-adsorbed, is thus removed. In these substeps S41 and S42, palladium (Pd) may be used instead of tin.

Next, in a silver mirror reaction coating substep S43, an ammoniacal silver nitrate solution and a reducer solution are applied together to the washed surface of the basecoat layer 13. This causes a silver mirror reaction between the solutions such that silver is deposited on the surface of the basecoat layer 13. The solutions may be easily applied to the basecoat layer 13 with a double-headed spray gun or a concentric spray gun. The deposited silver replaces the tin on the surface of the basecoat layer 13 and is adsorbed to and accumulated on the surface of the basecoat layer 13, thus forming the silver plating layer 14. In a subsequent washing step S44, the surface of the silver plating layer 14 is washed with ion exchange water or distilled water to remove excessive solution and tin. The method then moves on to a silver mirror reaction posttreatment substep S45.

Even after the washing substep S44, a trace quantity of impurities may remain adsorbed to the surface of the silver plating layer 14. Particularly, organic byproducts from the silver mirror reaction indicated by the formula (1) such as $NH_3$ or $R\text{—}CO_2NH_4$ may remain unwashed on the surface of the silver plating layer 14.

These impurities are modified through natural oxidization by oxygen in the ambient air, thus discoloring the surface of the silver plating layer 14 to an yellowish tone. This significantly hampers the appearance of the plated product 11. Thus, in the substep S45, an appropriate posttreatment is conducted to prevent the impurities from discoloring the silver plating layer 14. The posttreatment may be performed as an impurity disintegrating stage, an impurity adsorbing stage, or an antioxidant film forming stage. In the impurity disintegrating stage, the impurities are disintegrated to be removed from the surface of the silver plating layer 14. In the impurity adsorbing stage, the impurities are adsorbed to be removed from the surface of the silver plating layer 14. In the antioxidant film forming stage, a thin antioxidant film is formed on the surface of the silver plating layer 14.

More specifically, in the impurity disintegrating stage, a low concentration acid is applied to the surface of the silver plating layer 14 or the surface of the silver plating layer 14 is immersed in the acid, thus disintegrating the impurities to remove the impurities from the surface of the silver plating layer 14. As the acid, acetic acid, dilute sulfuric acid, dilute hydrochloric acid, formic acid, or chromic acid may be used. However, since acetic acid and dilute sulfuric acid efficiently remove the impurities from the surface of the silver plating layer 14 without adversely affecting the silver mirror surface of the silver plating layer 14, it is preferred that the substances be used. It is further preferred that the acid strength of the acid be $1.0 \times 10^{-5}$ to $1.0 \times 10^7$ in terms of acid constant Ka, or −7 to 5 in terms of pKa. If pKa is less than −7, the acid oxidizes the material of the silver plating layer 14, or silver, thus damaging the silver mirror surface of the silver plating layer 14. In contrast, if pKa exceeds 5, the impurities are not sufficiently removed. Further, it is preferred that 3 to 10 weight percent acetic acid or 2 to 6 weight percent dilute sulfuric acid be used.

In the subsequent impurity adsorbing stage, a protein dispersed solution is applied to the surface of the silver plating layer 14 or the surface of the silver plating layer 14 is immersed in the solution, thus enabling the protein to adsorb the impurities and remove the impurities from the surface of the silver plating layer 14. The protein dispersed solution includes mammalian milk such as cow milk and powdered milk. However, it is preferred that casein dispersed in water or a low-concentration aqueous alcohol solution as solvent be used as the protein dispersed solution.

In the antioxidant film forming stage, a metal surface treatment agent is applied to the surface of the silver plating layer 14 or the surface of the silver plating layer 14 is immersed in the agent, thus forming a thin antioxidant film on the surface of the silver plating layer 14.

The metal surface treatment agent includes known metal surface treatment agents that are applicable to other metals than silver. The metal surface treatment agent forms a highly water-repellent antioxidant film, as applied to the surface of the silver plating layer 14 or other metal surfaces or metal plated surfaces. If the antioxidant film is formed on the surface of the silver plating layer 14, the film physically inhibits the exposure of the surface of the silver plating layer 14 to the ambient air. The film thus functions as an antioxidant film that prevents the impurities on the surface of the silver plating layer 14 from being naturally oxidized by oxygen in the ambient air. Also, the film prevents the impurities from being nitrided by nitrogen in the ambient air.

It is most preferred that Top Rinse (brand name) of OKUNO SEIYAKU KOGYO KABUSHIKI KAISHA be used as the metal surface treatment agent. More specifically, it is preferred that the product be used as an aqueous solution of 1 to 50 weight percent. If the concentration of the product is less than one weight percent, the antioxidant effect on the surface of the silver plating layer 14 becomes insufficient. In contrast, if the concentration of the product exceeds 50 weight percent, the color of the surface of the silver plating layer 14 turns opaque.

After the silver mirror reaction posttreatment substep S45 is completed, a washing substep S46 is conducted. In S46, the surface of the silver plating layer 14 is washed with ion exchange water or distilled water. Subsequently, in a water blowing substep S47, water is blown by air and is removed from the surface of the silver plating layer 14. The surface of the silver plating layer 14 is then dried at approximately 50 degrees Celsius for 30 minutes in a drying substep S48. Next, a topcoat forming step (TC forming step) S50 is conducted.

In the TC forming step S50, the topcoat layer 15 is formed on the surface of the silver plating layer 14 using a topcoat agent. The step S50 includes a topcoat agent applying substep S51 followed by a drying substep S52. In the substep S51, the topcoat agent is applied uniformly to the surface of the silver plating layer 14. The surface of the silver plating layer 14 is then dried at approximately 70 degrees Celsius for about 60 minutes in the drying substep S52. The topcoat layer 15 is thus completed.

As fabricated by the above-described method, the plated product 11 includes the basecoat layer 13, the silver plating layer 14, and the topcoat layer 15 that are formed on the design surface of the base 12 in this order. As described, no impurities are caught between the silver plating layer 14 and the topcoat layer 15. Even if the impurities are found, the antioxidant film, or the outermost surface of the silver plating layer 14 physically prevents the impurities from being naturally oxidized. This suppresses yellowish discoloration of the design surface of the plated product 11. Accordingly, a white reflected light is visible on the design surface of the plated product 11, and the appearance of the product 11 is improved. It is preferred that the plated product 11 be used in automobile interior ornaments such as a cluster gauge, a center cluster, a register, and a center console, automobile exterior ornaments such as a wheel cover, a bumper molding, a wheel garnish, a grill radiator, and a back panel, or components other than automobile parts such as an air-conditioner housing, a cellular phone, or notebook type personal computer.

The illustrated embodiments have the following effects.

As described, the basecoat layer 13 and the silver plating layer 14 are first formed on the surface of the base 12. The impurities are then removed from the surface of the silver plating layer 14. Subsequently, the topcoat layer 15 is formed on the surface of the silver plating layer 14. Thus, since the impurities are efficiently removed from the surface of the silver plating layer 14, the impurities are prevented from discoloring the silver plating layer 14.

In the impurity disintegrating stage, acid is applied to the surface of the silver plating layer 14 or the surface of the silver plating layer 14 is immersed in the acid. This efficiently disintegrates the impurities to remove the impurities from the surface of the silver plating layer 14. Further, if 3–10 weight percent acetic acid or 2–6 weight percent dilute sulfuric acid is used to disintegrate the impurities, the impurities are readily and reliably removed from the surface of the silver plating layer 14 without damaging the silver mirror surface of the silver plating layer 14. In addition, the acids are relatively easy to handle and is inexpensively available.

In the impurity adsorbing stage, the protein dispersed solution is applied to the surface of the silver plating layer 14 or the surface of the silver plating layer 14 is immersed in the solution. This efficiently adsorbs the impurities to remove the impurities from the surface of the silver plating layer 14.

In the illustrated embodiment, after the basecoat layer 13 and the silver plating layer 14 are formed on the surface of the base 12, the antioxidant film forming stage is performed to form the antioxidant film on the surface of the base 12. The topcoat layer 15 is then formed on the surface of the silver plating layer 14. The antioxidant film inhibits exposure of the surface of the silver plating layer 14 to the ambient air. Accordingly, even if the surface of the silver plating layer 14 includes impurities, the antioxidant film reliably prevents the impurities from being naturally oxidized. The discoloration of the silver plating layer 14 is thus reliably stopped from occurring. Further, the antioxidant film is easily formed by applying the metal surface treatment agent to the surface of the silver plating layer 14. In addition, a general type may be used as the metal surface treatment agent for forming the antioxidant film. The metal surface treatment agent is thus readily available and is inexpensive.

The following is examples of the illustrated embodiment and their comparative examples.

EXAMPLE 1

First, the base 12 with a square plate shape was formed of ABS through injection molding. The pretreatment substep S31 was then completed by spraying isopropanol on the surface (the design surface) of the base 12. Subsequently, in the basecoat agent applying substep S32, a double-liquid hardened type polyurethane resin (EB2854A-5(brand name) of FUJIKURA KASEI KABUSHIKI KAISHA) was sprayed on the design surface of the base 12 as a basecoat agent. The drying substep S33 was then performed in a drying furnace at 80 degrees Celsius for 60 minutes. The basecoat layer 13 with a uniform thickness of approximately 20 micrometers was thus formed on the design surface of the base 12.

Further, a solution that contained three weight percent of stannic chloride and one weight percent of hydrochloric acid was sprayed on the surface of the basecoat layer 13, thus completing the silver mirror reaction pretreatment substep S41. The surface of the basecoat layer 13 was then washed by spraying ion exchange water of 3 µS/cm or lower on the surface of the basecoat layer 13 to complete the washing substep S42. Subsequently, in the silver mirror reaction coating substep S43, Tollens reagent and glyoxal were sprayed on the surface of the basecoat layer 13 using a double-headed spray gun. The silver plating layer 14 with a uniform thickness of approximately 1000 Angstrom was then formed on the surface of the basecoat layer 13. Afterwards, the surface of the silver plating layer 14 was washed by spraying ion exchange water on the surface of the silver plating layer 14, thus completing the washing substep S44.

Next, in the silver mirror reaction posttreatment substep S45, a metal surface treatment agent (a 10 weight percent aqueous solution of Top Rinse of OKUNO SEIYAKU KOGYO KABUSHIKI KAISHA) was sprayed on the surface of the silver plating layer 14. The surface of the silver plating layer 14 was then washed by spraying ion exchange water on the surface of the silver plating layer 14, thus completing the washing substep S46. Subsequently, in the water blowing substep S47, compressed air was blown (an air blow was produced) to the surface of the silver plating layer 14. Afterwards, the drying substep S48 was performed in a drying furnace at 50 degrees Celsius for 30 minutes.

Finally, a topcoat agent (PTC-02(brand name) of FUJIKURA KASEI KABUSHIKI KAISHA, silicone acrylic coating materials) was sprayed on the surface of the silver plating layer 14, thus completing the topcoat agent applying substep S51. The plated product 11 was then subjected to the drying substep S52 in a drying furnace at 70 degrees Celsius for 60 minutes. The topcoat layer 15 with a uniform thickness of approximately 20 micrometers was thus formed on the surface of the silver plating layer 14. The obtained plated product 11 had the base 12 on which the basecoat layer 13, the silver plating layer 14, and the topcoat layer 15 were formed.

COMPARATIVE EXAMPLE 1

Comparative Example 1 was produced in the same manner as Example 1, except that the silver mirror reaction posttreatment substep S45 and the washing substep S46 were omitted. The obtained plated product had the base 12 on which the basecoat layer 13, the silver plating layer 14, and the topcoat layer 15 were formed.

EXAMPLE 2

In Example 2, B-3(brand name, acrylic urethane coating materials) of OHASHI KAGAKU KOGYO KABUSHIKI KAISHA was used as the basecoat agent, and T-2(brand name, acrylic urethane coating materials) of OHASHI KAGAKU KOGYO KABUSHIKI KAISHA was used as the topcoat agent. Further, formation of an undercoat layer was performed between the drying substep S33 and the silver mirror reaction pretreatment substep S41. That is, an undercoat agent (U-2 of OHASHI KAGAKU KOGYO KABUSHIKI KAISHA, bisphenol type epoxy coating materials) was sprayed on the surface of the basecoat layer 13, thus forming the undercoat layer. The remainder of Example 2 was performed in the same manner as Example 1. The obtained plated product 11 had the base 12 on which the basecoat layer 13, the undercoat layer, the silver plating layer 14, and the topcoat layer 15 were formed.

COMPARATIVE EXAMPLE 2

Comparative Example 2 was produced in the same manner as Example 2, except that the silver mirror reaction posttreatment substep S45 and the washing substep S46 were omitted. The obtained plated product had the base 12 on which the basecoat layer 13, the undercoat layer, the silver plating layer 14, and the topcoat layer 15 were formed.

Measurement 1 of $\Delta b^*$

The plated products 11 of Examples 1, 2 and the plated products of Comparative Examples 1, 2 were subjected to measurement of $\Delta b^*$ in accordance with Lab color system using a spectral colorimeter. As a comparative sample, a standard wet type plated product of Chromium(VI) was also subjected to the measurement. Based on the measurements, the value $\Delta b^*$ was obtained for each of the plated products of Examples and Comparative Examples by subtracting value $b^*$ of the comparative sample from value $b^*$ of the plated product. The obtained results are shown in Table 1.

TABLE 1

|  | $\Delta b^*$ |
| --- | --- |
| Comparative Example 1 | 8.03 |
| Example 1 | 4.03 |
| Comparative Example 2 | 7.32 |
| Example 2 | 4.23 |

As shown in Table 1, the values $\Delta b^*$ of the plated products 11 of Examples 1, 2 were less than five, although the values $\Delta b^*$ of the plated products of Comparative Examples 1, 2 exceeded five. To obtain an optimal visible appearance in the silver plating layer 14 when the plated product 11 is subjected to a preliminary test, it is preferred that the value $\Delta b^*$ is less than or equal to five (0–5), as has been confirmed. Actually, a slight yellowish discoloration was visible in the plated product of each Comparative Example. In contrast, no such discoloration was visible in the plated product 11 of each Example.

EXAMPLE 3

In the silver mirror reaction posttreatment substep S45, the surface of the silver plating layer 14 was washed by spraying 1, 2, 3, 4, 5, 7.5, 10, 12.5, 15 and 20 weight percent aqueous solutions of acetic acid on the surface of the silver plating layer 14, instead of applying the metal surface treatment agent to the surface of the silver plating layer 14. The remainder of Example 3 was performed in the same manner as Example 1. Each obtained plated product 11 had the base 12 on which the basecoat layer 13, the silver plating layer 14, and the topcoat layer 15 were formed.

EXAMPLE 4

In the silver mirror reaction posttreatment substep S45, the surface of the silver plating layer 14 was washed by spraying 1, 2, 3, 4, 5, 7, 8, 9 and 10 weight percent aqueous solutions of sulfuric acid on the surface of the silver plating layer 14, instead of applying the metal surface treatment agent to the surface of the silver plating layer 14. The remainder of Example 4 was performed in the same manner as Example 1. Each obtained plated product 11 had the base 12 on which the basecoat layer 13, the silver plating layer 14, and the topcoat layer 15 were formed.

EXAMPLE 5

In the silver mirror reaction posttreatment substep S45, the surface of the silver plating layer 14 was washed by spraying casein dispersed in water on the surface of the silver plating layer 14, instead of applying the metal surface treatment agent to the surface of the silver plating layer 14.

The remainder of Example 5 was performed in the same manner as Example 1. The obtained plated product 11 had the base 12 on which the basecoat layer 13, the silver plating layer 14, and the topcoat layer 15 were formed.

Measurement 2 of Δb*

The plated products 11 of Examples 3–5 and a standard wet type plated product of Chromium(VI), or a comparative sample, were subjected to measurement of Δb* in accordance with Lab color system using a spectral calorimeter. As a result, in Example 3, the values Δb* of the plated products 11 that had been washed with the 1–2 weight percent aqueous solutions of acetic acid exceeded five, while the values Δb* of the plated products 11 that had been washed with the 3–10 weight percent aqueous solutions of acetic acid were less than or equal to five. Further, no silver mirror surface was formed on the silver plating layer 14 in each of the plated products 11 that had been washed with the aqueous solutions of acetic acid at 12.5 weight percent or more. In Example 4, the values Δb* of the plated products 11 that had been washed with the 1 weight percent aqueous solution of sulfuric acid exceeded five, while the values Δb* of the plated products 11 that had been washed with the 2–6 weight percent aqueous solutions of sulfuric acid were less than or equal to five. Further, no silver mirror surface was formed on the silver plating layer 14 in each of the plated products 11 that had been washed with the aqueous solutions of dilute sulfuric acid at 7 weight percent or more. In Example 5, the value Δb* of the plated products 11 was less than or equal to five.

It should be apparent to those skilled in the art that the present invention may be embodied in many other specific forms without departing from the sprit or scope of the invention. Particularly, it should be understood that the invention may be embodied in the following forms.

After completing the impurity disintegrating stage in the silver mirror reaction posttreatment substep S45, the surface of the silver plating layer 14 may be washed with water and then may be subjected to the impurity adsorbing stage. Alternatively, in the substep S45, after completing the impurity adsorbing stage, the surface of the silver plating layer 14 may be washed with water and then may be subjected to the impurity disintegrating stage. In other words, the impurity disintegrating stage and the impurity adsorbing stage may be combined in the substep S45. If this is the case, the impurities are further efficiently removed from the surface of the silver plating layer 14.

After completing the impurity disintegrating stage or the impurity adsorbing stage in the silver mirror reaction posttreatment substep S45, the surface of the silver plating layer 14 may be washed with water and then may be subjected to the antioxidant film forming stage. Alternatively, after completing the combination of the impurity disintegrating stage and the impurity adsorbing stage in the substep S45, the surface of the silver plating layer 14 may be washed with water and then may be subjected to the antioxidant film forming stage. In these cases, the yellowish discoloration of the plated product 11 is further efficiently stopped.

The silver plating layer 14 does not necessarily have to be formed by a chemical plating method (electroless deposition). However, the silver plating layer 14 may be formed by an electric plating method or a roll leaf hot stamping method. If this is the case, a silver mirror reaction posttreatment substep identical with the substep S45 need be performed after the silver plating layer 14 is formed.

When forming a plated product using metal other than silver, a silver mirror reaction posttreatment substep identical with the substep S45 may be performed after a metal plating layer is formed.

The material of the base 12 includes molded bodies of rubber, glass, ceramics, wood, or paper with various shapes, as long as the basecoat layer 13 can be formed directly or indirectly on the surface of the base 12. Further, the base 12 may be formed of thermoplastic resin other than the one used in the illustrated embodiment or thermally hardened resin.

The present examples and embodiments are to be considered as illustrative and not restrictive and the invention is not to be limited to the details given herein, but may be modified within the scope and equivalence of the appended claims.

What is claimed is:

1. A method for fabricating a plated product with a basecoat layer, a metal plating layer, and a top coat layer that are formed on a surface of a base, the method comprising:

forming the basecoat layer and the metal plating layer successively on the surface of the base;

removing impurities from a surface of the metal plating layer after the forming of the basecoat layer and the metal plating layer, wherein the impurity removing includes adsorbing the impurities by applying a protein dispersed solution to the surface of the metal plating layer or immersing the surface of the metal plating layer in the solution, and forming the topcoat layer on the surface of the metal plating layer after the removal of the impurities.

2. A method for fabricating a plated product with a basecoat layer, a metal plating layer, and a topcoat layer that are formed on a surface of a base, the method comprising:

forming the basecoat layer and the metal plating layer on the surface of the base;

disintegrating impurities by applying an acid to a surface of the metal plating layer or immersing the surface of the metal plating layer in the acid after the formation of the basecoat layer and the metal plating layer;

adsorbing the impurities by applying a protein dispersed solution to the surface of the metal plating layer or immersing the surface of the metal plating layer in the solution after the disintegration of the impurities; and forming the topcoat layer on the surface of the metal plating layer after the adsorption of the impurities.

3. The method according to claim 2, further comprising forming an antioxidant film on the surface of the metal plating layer, wherein forming an antioxidant film is performed between the impurity adsorbing and the topcoat layer forming.

4. A method for fabricating a plated product with a basecoat layer, a metal plating layer, and a topcoat layer that are formed on a surface of a base, the method comprising:

forming the basecoat layer on the surface of the base, wherein the basecoat layer is obtained by applying a basecoat agent to the surface of the base or immersing the surface of the base in the basecoat agent and drying the basecoat agent on the surface of the base;

forming the metal plating layer on the basecoat layer, wherein the metal plating layer is obtained by a chemical silver plating method;

removing impurities from the surface of the metal plating layer after the formation of the basecoat layer and the metal plating layer, wherein the impurity removing includes adsorbing the impurities by applying a protein dispersed solution to the surface of the metal plating layer or immersing the surface of the metal plating layer in the solution; and forming the topcoat layer on the surface of the metal plating layer after the removal of the impurities.

* * * * *